United States Patent [19]

Schaar

[11] Patent Number: 5,757,928
[45] Date of Patent: May 26, 1998

[54] AUDIO AMPLIFIER ARRANGEMENT FOR MORE THAN TWO REPRODUCTION CHANNELS

[75] Inventor: Reinhard Schaar, Straubenhardt, Germany

[73] Assignee: Nokia Technology GmbH, Germany

[21] Appl. No.: 729,328

[22] Filed: Oct. 15, 1996

[30] Foreign Application Priority Data

Oct. 19, 1995 [DE] Germany ............... 195 39 034.2

[51] Int. Cl.$^6$ .................................................. H04R 5/00
[52] U.S. Cl. .......................................... 381/22; 381/27
[58] Field of Search ............................ 381/18, 19, 20, 381/21, 22, 23, 27, 28, 59

[56] References Cited

U.S. PATENT DOCUMENTS

| 4,905,284 | 2/1990 | Kwang ........................... 381/27 |
| 4,953,213 | 8/1990 | Tasaki et al. .................. 381/22 |
| 5,197,099 | 3/1993 | Hirasawa ....................... 381/22 |

FOREIGN PATENT DOCUMENTS

| 0584719 | 3/1994 | European Pat. Off. . |
| 4030121 | 4/1991 | Germany . |

OTHER PUBLICATIONS

"Dolby Surround Prologic" In: Radio Fernsehen Elektronik, Nr. 11, 1994, Seite 68–69.
"Dolby Surround Prologic" In: Radio Fernsehen Elektronik, Nr. 12, 1994, Seite 56–57.

Parent Abstracts of Japan zu JP 07-162 999 A. 23 Jun. 1995.

*Primary Examiner*—Curtis Kuntz
*Assistant Examiner*—Vivian Chang
*Attorney, Agent, or Firm*—Ware, Fressola, Van Der Sluys & Adolphson LLP

[57] ABSTRACT

An audio amplifier arrangement contains reproduction channels (R, L, C, SR) with corresponding channel outputs, to which a selectable number and/or assignment of different combinations of sound radiators can be connected in the form of loudspeakers (Lr, Ll) and/or external loudspeaker boxes (Br, Bl, Bc) to obtain different reproduction modes, and a signal processor which can be switched in such a way, that different audio signals (Vr', Vl', Vc, Vcr) are made available for the reproduction channels, to obtain the different reproduction modes. Connecting the corresponding external loudspeaker boxes to predetermined channel outputs requires a change in the reproduction mode, whereby the assignment of already connected sound radiators is changed, and/or the signal processor is switched. According to the invention, part of the channel outputs have first and second switching means (Sr, Sl, Sc), which automatically make the required change in the operating mode when external loudspeaker boxes are connected.

7 Claims, 3 Drawing Sheets

AUDIO AMPLIFIER ARRANGEMENT FOR MORE THAN TWO REPRODUCTION CHANNELS

TECHNICAL FIELD

The invention concerns an audio amplifier arrangement for more than two reproduction channels with amplifier outputs, which a user can connect to loudspeakers in different ways.

BACKGROUND OF THE INVENTION

Such an audio amplifier arrangement is designed for the spatial reproduction of sound events, particularly in accordance with the known Dolby-Surround-Sound System from Dolby Laboratories, San Francisco, U.S.A. The audio amplifier arrangement is fed by a Dolby-Pro-Logic processor, which has the following four output channels:

one channel each with lateral information for the right (R) and the left (L) channels, to drive loudspeakers that are located to the right and left of the listener, a center channel (C) for the central information, to drive a loudspeaker that is centrally located with respect to the listener, and a surround-sound channel (SR) for ambient noise, connected to two loudspeakers which are located right and left behind the listener.

For example, in a television set containing a Dolby-Pro-Logic arrangement, as a rule the five cited loudspeakers must also be connected in the form of loudspeaker boxes, to achieve a corresponding reproduction quality. By comparison with a conventional television set with stereo sound, this requirement represents considerable additional expense for the user. For that reason, television sets with Dolby-Pro-Logic arrangements are generally delivered without any loudspeaker boxes by the manufacturer. As before, the device contains internal box loudspeakers to reproduce the right and the left information, and the user can attach any number of external loudspeakers. In addition to the two extreme operating methods: "Operation with internal loudspeakers but without external loudspeaker boxes" and "Operation with external loudspeaker boxes only", there are other desirable combinations, particularly for wiring the lateral channels (R and L) and the center channel (C) which, although they do not make full quality surround-sound reproduction possible, provide however a significant improvement in reproduction quality, as opposed to the reproduction with internal loudspeakers alone.

In this way it is possible on the one hand to connect a pair of external loudspeaker boxes to the television set to reproduce the lateral information, without connecting a box for the center channel. In such a case it is desirable to use the internal loudspeakers exclusively for reproducing the center information. On the other hand it is possible to connect an external loudspeaker box to the television set to reproduce the center channel, and the lateral information can be reproduced by the internal loudspeakers. Another possible combination is to use an external surround-sound device. In that case it is also desirable to use the internal loudspeakers to reproduce the center information.

These explanations illustrate the technical problem which forms the basis of the invention. The different variations in the wiring of external loudspeakers require a control which on the one hand switches the internal loudspeakers off for certain variations, and on the other supplies different signals to the internal loudspeakers. While the problem of switching off the internal loudspeakers can be solved with known loudspeaker switching jacks, the problem of supplying different signals cannot be solved with such jacks. The solution of the problem is made even more difficult by the fact that, on the one hand, in the case where no external loudspeakers are connected to the center channel or to the lateral channels, the internal loudspeakers are driven by a signal in which the signal processor superimposes the center information on the lateral channel. This means that the signal processor must be switched over to avoid a corresponding superimposition, both when a loudspeaker box is connected to the center channel, and when loudspeaker boxes are connected to the lateral channels. On the other hand, it is an advantage for such an application wherein only one external loudspeaker box is connected to the center channel, to switch the signal processor in a way so that the base width, and thereby the lateral information are increased in the lateral channel, in accordance with a known process. To achieve the desirable wiring possibilities, the sound part of a television set must be switchable between at least five different operating modes. In known television sets, an internal remote control system is used to manually switch between these operating modes. This requires much switching effort and is cumbersome for the user, since the selection of the correct operating mode is not possible without studying a corresponding operating manual.

The DE magazine Radio Television Electronics no. 11, 1994, on pages 68, 69, and no. 12, 1994, on pages 56, 57 describes for example the television receivers ST 63-760/9 DPL and ST 72-760/9 DPL from the Grundig Company. By means of an operating software, these receivers can be adjusted for surround reproduction, special Dolby operating modes such as Dolby Phantom, Dolby-3 Stereo, Pseudo Surround or for normal stereo reproduction. This involves operation control via the display screen, where the loudspeaker configuration which is required for the selected operating mode can also be displayed.

The audio part of these television receivers contains a total of six power amplifiers, of which only five can be active at one time. The task of the operating software is firstly to realize a switching-over of each input of the two power amplifiers for the internal right or left loudspeaker from the R and L signal respectively to the center signal during Prologic and 3-Stereo operation, secondly to separate each input of the two power amplifiers for the external right or left loudspeaker from the R and L signal respectively depending on the selected operating mode, and thirdly to switch the power amplifiers which are not required for the selected operating mode to stand-by operation.

The adjustment of the operating modes takes place via menus, independently of the external loudspeaker wiring.

The receivers have no check-back installations for externally connected loudspeakers. The result can be a defective audio reproduction when a wrong menu has been selected. During Prologic and 3-Stereo operation for example, the internal loudspeakers always reproduce the center signal, thus a mono-signal, even when no external loudspeakers have been connected. During normal stereo operation there is no autonomous switch-over to externally connected R and L boxes and no cancellation of the base widening. The internal loudspeakers of the receiver are intended to exclusively reproduce the center channel. It is not possible to connect a center box in conjunction with external R and L boxes, nor alone.

In this way no operation is possible where the lateral information can be reproduced via the internal loudspeakers and the central information via an external box located centrally above or below the television receiver. Beyond that the known solution requires more power amplifiers than the audio reproduction system has channels, and extensive electronic means for switching the amplifier inputs and to turn off the power amplifiers.

A device for a multichannel audio reproduction is known from the publication DE-A-4030121, in which a current detector each is placed in both the output circuit of the power amplifier for the center channel and in the output circuit of the power amplifier for the surround channel. The current detectors check the impedance of the loudspeaker connections. If the lack of the central channel is detected because of a high load impedance, the respective current detector closes a first circuit arrangement and a first signal processing circuit adds a portion of the central channel to each channel containing the lateral information R, L. If the lack of the surround boxes is detected, the respective current detector closes a second circuit arrangement and a second signal processing circuit adds a portion of the surround signal to each channel L and R.

With the known solution, a predetermined function is assigned to each loudspeaker connection. It is not possible for example to use internal loudspeakers as both central loudspeakers or as loudspeakers for lateral information as a function of the wiring or, if central and R - L loudspeaker boxes are provided, to switch these off completely.

SUMMARY OF THE INVENTION

It is therefore the task of the invention to present a solution whereby the manual selection of the operating mode of an audio amplification arrangement can be avoided, at a small additional expense.

To fulfill the task the invention discloses an audio amplification arrangement for more than two reproduction channels, with a signal processor that can be switched over to achieve different reproduction modes to make different audio signals available for the reproduction channels, with internal loudspeakers, and with power amplifiers in the reproduction channels, where different combinations of sound radiators can be selectively connected to the internal loudspeakers and/or to external loudspeaker boxes to achieve different modes of reproduction, where a connection of respective external loudspeaker boxes to predetermined power amplifiers requires a change in the reproduction mode, whereby the function of the internal loudspeakers changes and/or the signal processor is switched over, characterized in that first and second switching means are provided at the outputs of the power amplifiers, which autonomously perform the required change when external loudspeaker boxes are connected, where the first switching means switch over the signal processor so that it makes changed audio signals available for predetermined power amplifiers, and where the second switching means switch the internal loudspeakers to different outputs of the power amplifiers.

Such an arrangement comprises reproduction channels with audio power amplifiers, internal loudspeakers and a signal processor, which can be switched so that different audio signals are made available to the reproduction channels to achieve the different kinds of reproduction. The power amplifiers contain channel outputs to which, as a function of the number and/or the assignment, different combinations of sound radiators can be selectively connected with the internal loudspeakers and/or external loudspeaker boxes, to achieve different kinds of reproduction. In that case the connection of respective external loudspeaker boxes to predetermined channel outputs requires a change in the reproduction mode, whereby the assignment of the internal loudspeakers to the reproduction channel changes, and/or the signal processor is switched over.

According to the invention, a part of the channel outputs has first and second switching means, which autonomously perform the required change in the operating mode when external loudspeaker boxes are connected. In that case the first switching means switch the signal processor, so that it makes changed audio signals available for the input of predetermined power amplifiers. The second switching means switch over the internal loudspeakers between the channel outputs of different reproduction channels.

In a special configuration of the invention for an audio amplifier arrangement with the Dolby-Pro-Logic method, in addition to the reproduction channel for a surround-sound signal, one reproduction channel each is provided for a right and a left lateral signal, and for a center signal. The first switching means switches the signal processor into a first operating mode, whereby the center signal is superimposed on the lateral signal in the corresponding reproduction channels, if no external loudspeaker box is connected to the lateral signal reproduction channels, or to the center channel.

However, if at least one external loudspeaker box is connected to one of the three reproduction channels, the first switching means switches the signal processor into a second operating mode, whereby lateral signals are transmitted without any superimposed center signal. In a further development of this configuration of the audio amplifier arrangement, the first switching means switches the signal processor into a third operating mode. In this operating mode, the signal processor artificially broadens the base width of the lateral signals which are transmitted in the corresponding reproduction channels, when no external loudspeaker boxes are connected to the lateral signal reproduction channels, and one external loudspeaker box is connected to the center signal reproduction channel.

The described configuration of the invention ensures that the signal processor, which in the present case is a Dolby-Pro-Logic surround-sound processor, is automatically switched over as a function of the wiring arrangement of the lateral channels and the center channel, so that it prepares an optimum signal for the respective wiring arrangement. This means that when the lateral channels and the center channel are not externally wired, the internal loudspeakers reproduce signals on which the signal processor superimposes the center signal to improve the midrange location. But if the lateral channels are not externally wired and the center channel is externally wired, the internal loudspeakers reproduce lateral signals, whereby the signal processor enlarges the lateral channel base width by means of a known electronic enlargement of the lateral information, which means it increases the apparent effective acoustical distance of the sound radiators. However, if the lateral channels are externally wired, or the user has connected an external surround-sound device, the signal processor produces lateral signals which neither superimpose the center channel, nor broaden the base width.

The first switching means for switching the signal processor is obtained by connecting the channel outputs of the reproduction channels of the lateral signals and of the center signal to a DC voltage through a resistance network or a resistor-diode network, to produce control voltages which depend on the impedances of the sound radiators that are connected to the channel outputs.

The DC voltage is supplied to the channel outputs via impedances that are more than ten times larger than the impedances of the sound radiators, which as a rule are about 8 ohm, so that the control voltage level in a channel output drops from a high level (H) to a low level (L) when an external loudspeaker box is connected. A corresponding switching logic, which is adapted to the control portion of the signal processor being used, evaluates the DC voltage level in the output channels and switches the signal processor into the required operating mode.

Another detailed configuration of the invention concerns an automatic change of the assignment, or switching the internal loudspeakers off. To that end, the audio amplifier arrangement has a second switching means, which on the one hand connects both the internal right loudspeaker as well as the internal left loudspeaker to the reproduction channel for the respective lateral signal, if no external loudspeaker boxes are connected to these reproduction channels. On the other hand, the two switching means connect both internal loudspeakers to the center signal reproduction channel, if external loudspeaker boxes are connected to the lateral signal reproduction channels.

In a special configuration of the invention, the channel outputs contain plug contacts for connecting external loudspeaker boxes, particularly special loudspeaker jacks which, in contrast to known loudspeaker jacks, are connected to change-over switches that are isolated from the channel output. These plug contacts are the second switching means.

BRIEF DESCRIPTION OF THE DRAWINGS

The invention will be explained in the following by means of a configuration example. The respective figures illustrate.

BEST MODE FOR CARRYING OUT THE INVENTION

Figure 1:
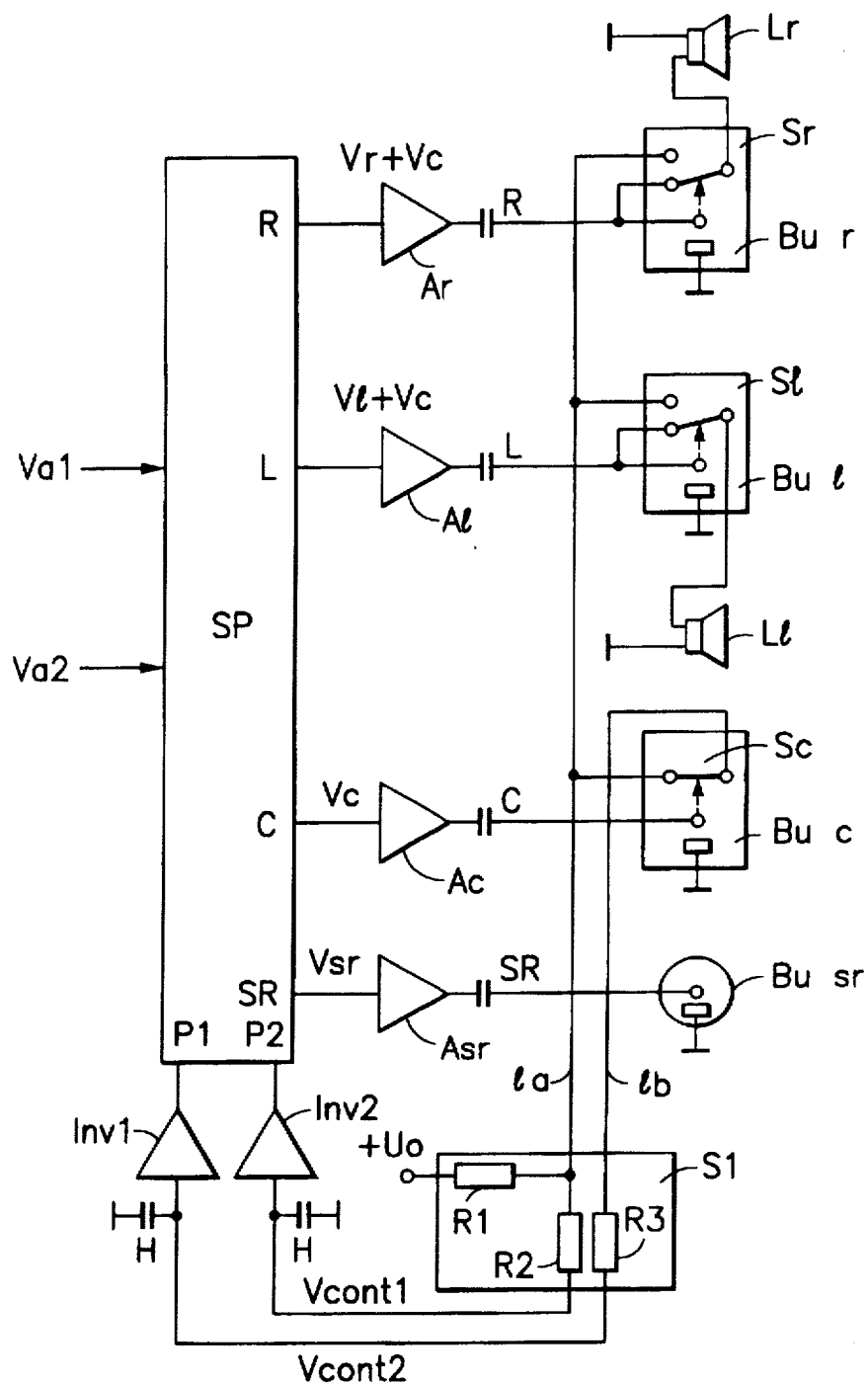
FIG. 1 a schematic diagram of an audio amplifier arrangement according to the invention, to which no external loudspeaker boxes are connected.

The configuration example concerns a Dolby surround-sound part for a television set. A not illustrated audio part of a television set extracts a first audio signal Va1 and a second audio signal Va2 from a complex video signal. As illustrated in FIG. 1, the audio signals Va1 and Va2 are located at the inputs of a signal processor SP. The signal processor SP is a known surround-sound processor, which generates a respective lateral signal Vr and Vl for a right reproduction channel R and a left reproduction channel L from the audio signals Va1 and Va2, as well as a center signal C for a reproduction channel C and a surround-sound signal for a reproduction channel SR. Each reproduction channel R, L, C and SR contains an audio output amplifier Ar, Al, Ac and Asr, to drive the sound radiators with a corresponding signal output. In addition to the mentioned audio signal inputs or outputs, the signal processor contains a control input P1 and a control input P2 for switching over to another reproduction mode. While the signal processor SP always generates a center signal Vc for the reproduction channel C and a surround-sound signal Vsr for the reproduction channel SR, irrespective of the control at the P1 and P2 inputs, the supply of control voltages Vcont1 and Vcont2 in corresponding logic level combinations causes the signal processor SP to generate different audio signals for the reproduction channels R and L, instead of the lateral signals Vr and Vl.

In a first logic level combination, a signal Vr+Vc or a signal Vl+Vc is made available for the reproduction channels R and L, while a signal Vr' and a signal Vl' is generated in a second logic level combination. The signal processor increases the lateral information part of the signals Vr' and Vl', as opposed to the lateral signals Vr and Vc. This broadens the base width during reproduction.

The audio amplifier arrangement described so far corresponds to the known solutions. The invention is implemented by connecting the channel outputs. In the configuration according to the example, each of the channel outputs of reproduction channels R and L has a plug receptacle Bur or Bul for connecting external loudspeaker boxes Br and Bl. Each plug receptacle Bur or Bul is mechanically coupled to a change-over switch Sr or Sl so that it switches from a first switching position to a second switching position when a plug is inserted into the plug receptacle Bur or Bul. In contrast to conventional jacks, where the inserted plug is electrically connected to the change-over switch Sr or Sl, the receptacles Bur and Bul are designed so that the inserted plug is at least isolated from the closed contacts of the change-over switch.

As illustrated in FIG. 1, the change-over switches Sr and Sl in plug receptacles Bur and Bul are connected to sound radiators in the form of loudspeakers Lr and Ll, which are located to the right and the left of the picture tube inside the television set. In the change-over switches Sr and Sl, a first switch connection is coupled to the reproduction channel R or L, so that the switch-over contact connects the reproduction channel R or L to the respective internal loudspeaker Lr or Ll when no plug is inserted into the receptacle. In contrast to the previously mentioned plug receptacles Bur and Bul, a plug receptacle Buc is connected to the channel output of the center signal Vc, and is mechanically coupled to an on-off switch in the usual manner. The latter is connected in such a way, that the switching contact couples the channel output of the reproduction channel C to a line 1a when a plug is inserted into the plug receptacle Buc. On the one hand, line 1a is always connected to the second switch connection of change-over switches Sr and Sl, and on the other to a DC voltage +Uo through a resistor R1. Line 1a, as well as a second line 1b, which is directly connected to the channel output of the center signal Vc, are used in conjunction with the resistor network R1, R2 and R3 and the DC voltage +Uo to produce the control voltages Vcont1 and Vcont2, which are supplied to the control inputs P1 and P2 via inverters Inv1 and Inv2. In the operating mode according to FIG. 1, both control voltages Vcont1 and Vcont2 are at a high level L. This corresponds to the first logic level combination and the signal processor generates the signal Vr+Vc for the reproduction channel R, and the signal Vl+Vc for the reproduction channel L. Since no external loudspeaker boxes are connected, the first position of change-over switches Sr and Sl ensures that the internal loudspeakers Lr and Ll radiate both the lateral signals Vr or Vl as well as the center signal.

Figure 2:
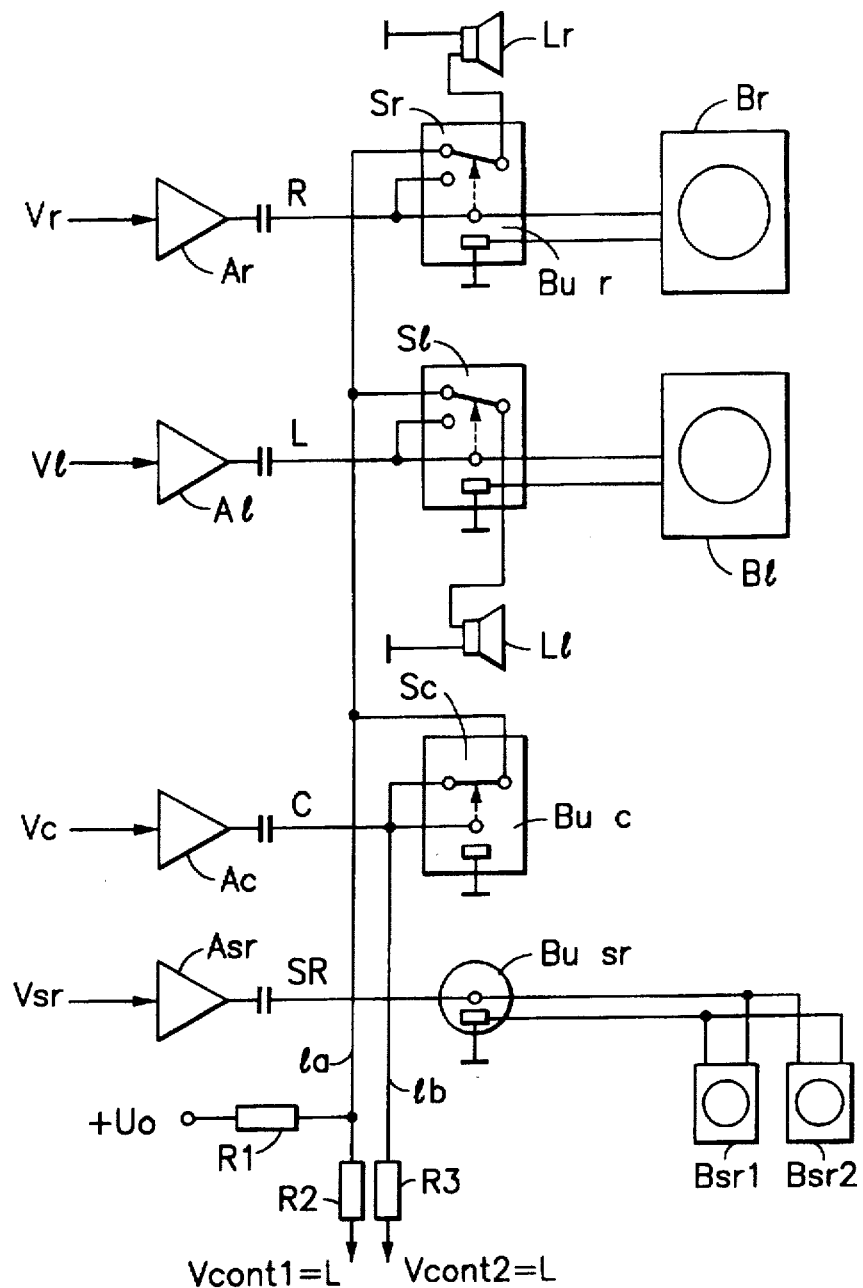
FIG. 2 a schematic diagram of an audio amplifier arrangement according to the invention, to which external loudspeaker boxes are connected.

FIG. 2 illustrates a section of the audio amplifier arrangement according to the invention. It differs from FIG. 1 in that this configuration example has external loudspeaker boxes Br and Bl connected to the channel outputs of the reproduction channels R and L. The insertion of the plugs from loudspeaker boxes Br and Bl into the plug receptacles Bur and Bul causes the change-over switches Sr and Sl to be positioned in the second switching position. The internal loudspeakers Lr and Ll are then automatically connected to the line 1a. The latter is connected to reproduction channel C through switch Sc. As a result, the external loudspeaker boxes Br and Bl reproduce lateral information, while the internal loudspeakers Lr and Ll are used to reproduce the center information.

Since in this reproduction mode the low impedance of loudspeakers Lr and Ll is connected to lines 1a and 1b, the predominant portion of the DC voltage +Uo is decreased by resistor R1. In this operating mode, both control voltages Vcont1 and Vcont2 are at a low level L. This corresponds to the logic level combination in which the signal processor generates the lateral signal Vr for the reproduction channel R, and the lateral signal Vl for the reproduction channel L.

Figure 3:
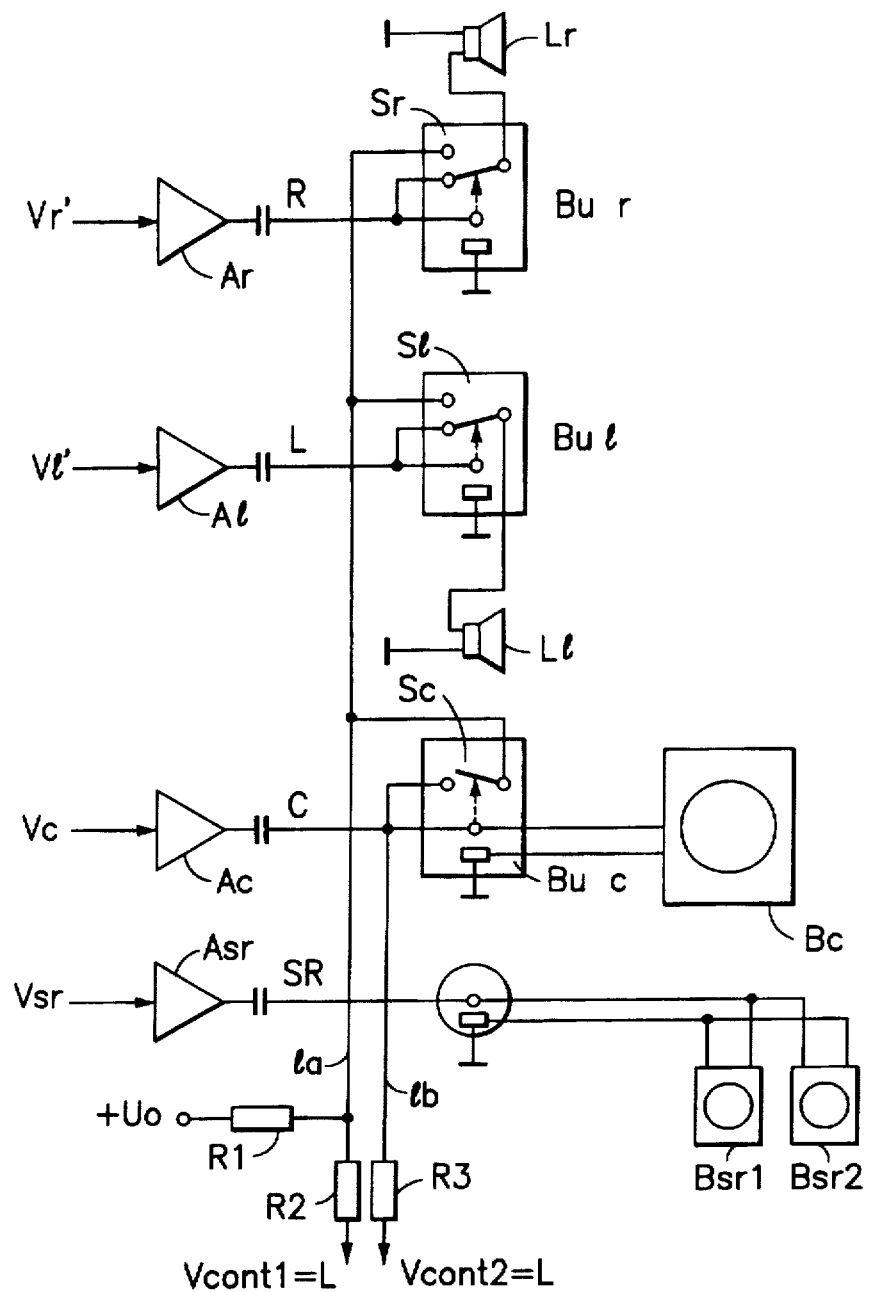
FIG. 3 a schematic diagram of an audio amplifier arrangement according to the invention, to which external loudspeaker boxes are connected for reproduction of the center information.

In contrast thereto, FIG. 3 illustrates a configuration example wherein, in addition to the external loudspeaker boxes Bsr1 and Bsr2, an external loudspeaker box Bc is connected to reproduce the center signal Vc. In another not illustrated mode of reproduction, wherein external loudspeaker boxes are connected to all reproduction channels, switch Sc separates the internal loudspeakers Lr and Ll from the reproduction channel C.

What is claimed is:

1. An audio amplifier arrangement for more than two reproduction channels (R, L, C, SR)

with a signal processor (SP) that can be switched over to achieve different reproduction modes to make different audio signals (Vr, Vl, Vc, Vsr, Vr+Vc, Vl+Vc) available for the reproduction channels (R, L, C, SR), with internal loudspeakers (Lr, Ll), and with power amplifiers (Ar, Al, Ac, Asr) in the reproduction channels, where different combinations of sound radiators can be selectively connected to the internal loudspeakers (Lr, Ll) and/or to external loudspeaker boxes (Br, Bl, Bc, Bsr1, Bsr2) to achieve different modes of reproduction, where a connection of respective external loudspeaker boxes (Br, Bl, Bc) to predetermined power amplifiers requires a change in the reproduction mode, whereby the function of the internal loudspeakers (Lr, Ll) changes and/or the signal processor (SP) is switched over, characterized in that first and second switching means are provided at the outputs of the power amplifiers, which autonomously perform the required change when external loudspeaker boxes are connected, where the first switching means switch over the signal processor so that it makes changed audio signals available for predetermined power amplifiers, and where the second switching means switch the internal loudspeakers (Lr, Ll) to different outputs of the power amplifiers.

2. An audio amplifier arrangement as claimed in claim 1, characterized in that at least one reproduction channel each is available for a right and a left lateral signal (Vr, Vl) and for a center signal (Vc), that the first switching means (Sl) switches the signal processor (SP) into a first operating mode, wherein the center signal (Vc) is superimposed on the lateral signals (Vr, Vl) when no external loudspeaker box (Br, Bl, Bc) is connected to any of the three reproduction channels, and that the first switching means (Sl) switches the signal processor (SP) into a second operating mode, wherein lateral signals are transmitted without superimposition of the center signal, if at least one external loudspeaker box (Br, Bl, Bc) is connected to one of the three reproduction channels.

3. An audio amplifier arrangement as claimed in claim 2, characterized in that the first switching means (Sl) switches the signal processor to a third operating mode, in which lateral signals (Vr', Vl') with artificially broadened base widths are transmitted when no external loudspeaker boxes (Br, Bl) are connected, and one external loudspeaker box (Bc) is connected to the reproduction channel for the center signal.

4. An audio amplifier arrangement as claimed in claim 2, characterized in that, to realize the first switching means (Sl) for switching the signal processor (SP), the channel outputs of the reproduction channels for the lateral signals (Vr, Vl) as well as for the center signal (Vc) are connected to a DC voltage through a resistor network or a resistor-diode network, so that control voltages (Vcont1, Vcont2) are available, which have a high level (H) when no external loudspeaker box (Br, Bl, Bc) is connected to the corresponding reproduction channel, and which have a low level (L) when at least one external loudspeaker box (Br, Bl, Bc) is connected to the corresponding reproduction channel, and the signal processor (SP) contains a switching logic that switches the signal processor (SP) to the necessary reproduction mode in accordance with the logic conditions of control voltages (Vcont1, Vcont2).

5. An audio amplifier arrangement as claimed in claim 2, characterized in that the second switching means (Sr, Sl) connect each of the internal loudspeakers (Lr, Ll) to the corresponding reproduction channel for lateral signals (Vr, Vl) when no external loudspeaker boxes (Br, Bl) are connected to these reproduction channels, and that the second switching means (Sr, Sl) connect both internal loudspeakers (Lr, Ll) to the reproduction channel for the center signal (Vc), when external loudspeaker boxes (Br, Bl) are connected to the reproduction channels for the lateral signals (Vr, Vl).

6. An audio amplifier arrangement as claimed in claim 5, characterized in that the second switching means (Sc) opens the connection to the internal loudspeakers (Lr, Ll) when one external loudspeaker box (Bc) is connected to the reproduction channel for the center signal.

7. An audio amplifier arrangement as claimed in claim 5, characterized in that the channel outputs have plug receptacles (Bur, Bul, Buc) for connecting external loudspeakers (Br, Bl, Bc), which are coupled to changeover switches that are isolated from the channel output in a way so that change-over switches are activated when external loudspeaker boxes (Bur, Bul, Buc) are connected, and that these change-over switches represent the second switching means (Sr, Sl, Sc).

* * * * *